Dec. 23, 1941.  W. B. BRONANDER  2,267,549
MACHINE FOR APPLYING LABELS TO PACKAGES
Filed Dec. 15, 1939
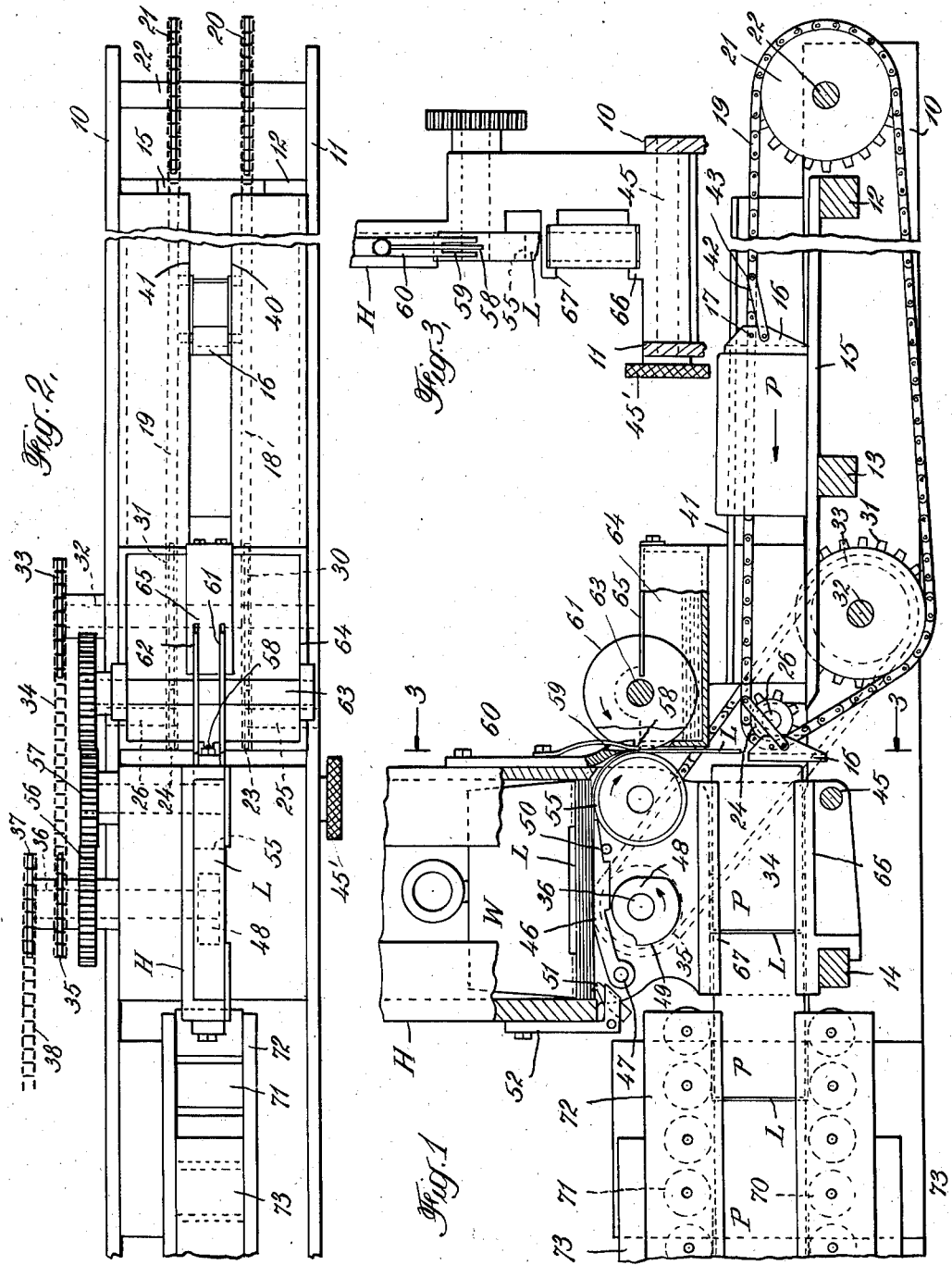
INVENTOR
Wilhelm B. Bronander
BY
Marshall & Hawley
ATTORNEYS Patented Dec. 23, 1941

2,267,549

UNITED STATES PATENT OFFICE 2,267,549

MACHINE FOR APPLYING LABELS TO PACKAGES

Wilhelm B. Bronander, Montclair, N. J.

Application December 15, 1939, Serial No. 309,317

8 Claims. (Cl. 216—52)

This invention relates to machines for applying labels to packages.

The machine is capable of general application, but has been particularly designed for the purpose of applying stamps to packages, such as tobacco packages.

The invention has for its salient object to provide a machine of the class specified that is simple and practical in construction, can be economically manufactured and will operate efficiently to apply and secure labels to packages.

Further objects of the invention will appear from the following specification taken in connection with the drawing which forms a part of this application, and in which Fig. 1 is a vertical sectional elevation of a machine constructed in accordance with the invention;

Fig. 2 is a top plan view of the machine shown in Fig. 1, parts being removed for the sake of clearness; and Fig. 3 is a sectional elevation taken substantially on line 3—3 of Fig. 1.

The invention briefly described consists of a machine comprising means for feeding packages to be labeled, a hopper for labels, means for feeding the labels one at a time from the hopper into the path of movement of the packages, means operable during the feeding movement of the label for rendering the label adhesive and means engageable with the label as the package and label are fed to fold the package across the front and top and bottom edges of the package to secure the label thereto. In conjunction with the label feeding mechanism intermittently operable means is provided for lifting the labels in the hopper to prevent the feeding of a second label until the first label has been fed across the path of movement of the package.

Further details of the invention will appear from the following description.

In the particular form of the invention illustrated in the drawing, the machine which is illustrated somewhat diagrammatically comprises side frames 10 and 11 which are connected by cross frame members 12, 13 and 14, a package support 15 being mounted on the cross frame members 12 and 13 for supporting the packages during their feeding movement.

The packages are fed along the support 15 by means of spaced feed bars or plates 16 which are pivoted at 17 to rods which in turn are mounted in feed chains 18 and 19. The chains 18 and 19 are mounted on sprockets 20 and 21 carried by a shaft 22 which is supported in the frame members 10 and 11 and at the other ends the chains are mounted on sprockets 23 and 24 carried by stub shafts 25 and 26.

The chains 18 and 19 also extend around sprockets 30 and 31 which are mounted on a shaft 32 carried by the frame members 10 and 11. The shaft 32 is the driving shaft for the chains and carries a sprocket 33 which is driven by a chain 34 from a sprocket 35 mounted on a shaft 36. The shaft 36 has secured to the outer end thereof a sprocket 37 which is driven by a chain 38 from any suitable source of power.

Each of the feed bars or plates 16 is pivotally mounted, as above described, on a rod 17 which is carried by the chains 18 and 19. As the chain is driven the feed bars or plates 16 engage the packages P and feed the packages along the support 15 between side plates or walls 40 and 41. As each feed bar or plate 16 reaches the end of its forward feeding movement it is carried downwardly, as shown in Fig. 1, and in order to maintain the feeding surface of the plate in a vertical plane as it disengages the package, each bar 16 is connected by a link 42 to a rod or pin 43 which is supported by the chains 18 and 19 and maintains the plate or bar 16 in vertical position during the period of movement when it disengages the package. This action is clearly shown in Fig. 1.

Label feeding mechanism

The labels or stamps L are supported in a hopper H which is carried by a frame detachably mounted between the walls 10 and 11 of the machine frame and supported on a cross member 14 and by a screw 45 having a head 45'. The screw is threaded through the two cross members and when the hopper frame is to be removed the screw is withdrawn, whereupon the hopper frame can be lifted and removed from the support 14. This is advantageous since different sizes of hoppers and labels can be easily and quickly mounted in the machine.

The labels L, as above stated, are supported in the hopper H and a weight W rests on top of the labels and exerts a downward pressure thereon. The labels are supported on a pivoted arm 46 which is mounted on a fixed pivot 47 and is engaged by a cam 48 mounted on the shaft 36, the cam having a raised portion 49, as shown in Fig. 1. In this figure the arm 46 rests on the lower portion of the cam 48 and is disposed in its lowermost position, the downward movement of the arm 46 being limited by a stop 50. The purpose of the cam 48 will be hereinafter described.

A spike or barb 51 is carried by a bracket 52 and engages the lowermost label L. As this label is fed in the manner hereinafter described, the barb will engage the next upper label and prevent its displacement.

The feeding of the labels is accomplished in the following manner: A feed roll 55 having a friction surface engages one edge portion of the lower label and feeds the label from the bottom of the stack. The roll 55 rotates continuously, being driven from the shaft 36 through gears 56 and 57. As the label leaves the bottom of the stack and is fed by the roll 55 it is pressed against the roll 55 by the weight of the stack of labels. As the rear edge portion of the label is engaged by the feed roll 55 the cam 48 will lift the arm 46 and release the weight of the stack from the label being fed and roll 55. The label is then pressed against the roll by a spring strip or rod 58 which extends through the bifurcated lower end 59 of a guide plate or bar 60. As the label is fed around by the roll 55 it is engaged at its edges by flanges 61 and 62 of a glue roller, the glue roller being mounted on a shaft 63 carried by a receptacle 64 in which a suitable adhesive is contained. A strip 65 is mounted on the receptacle and is bifurcated at its front end to receive the flanges 61 and 62 in order to remove excess adhesive therefrom.

As the label is fed downwardly it is fed across the path of movement of the package P and engages the front wall of the package as the package is fed across the space between the support 15 and a support 66. The label feed and package feed are so timed that the label will be clamped or held between the front of the package being fed and the back of the package last fed and disposed on support 66. The package is also engaged by a top wall 67 which in conjunction with the support 66 folds the ends of the label across the top and bottom surfaces of the package.

After the bottom label has been fed from beneath the stack by the feed roll 55, the stack of labels is temporarily lifted by the engagement of the raised portion 49 of the cam 48 with the arm 46. This permits the package to engage the label just fed and to be pushed into the label folding means before the next label is fed.

The packages are fed between the bottom and top walls 56 and 57 by the next succeeding packages and are fed from the support 66 between two sets of rollers 70 and 71 which are carried by a frame 72. This frame is provided with heaters 73 which heat the rollers and frame and dry the label on the package so that it securely adheres thereto.

From the foregoing specification it will be clear that a simple and practical machine has been provided for applying stamps or labels to packages and that by means of the machine labels will be efficiently applied to and secured to the packages.

Although one specific embodiment of the invention has been particularly shown and described it will be understood that the invention is capable of modification and that changes in the construction and in the arrangement of the various cooperating parts may be made without departing from the spirit and scope of the invention, as expressed in the following claims.

What I claim is:

1. In a machine for applying labels, means for feeding packages to be labeled, a hopper for labels, means for feeding the labels, one at a time from the hopper into the path of movement of the packages, said label feeding means comprising a feed roll engageable with the bottom label in the hopper, and means for intermittently lifting the labels in the hopper as the rear edge portion of the bottom label engages the feed roll to release the label from the weight of the stack of labels and means for holding the label being fed against the feed roll after the stack of labels has been lifted.

2. In a machine for applying labels, means for feeding packages to be labeled, a hopper for labels, means for feeding the labels one at a time from the hopper into the path of movement of the packages, said label feeding means comprising a feed roll engageable with the bottom label in the hopper, guiding means for guiding the label downwardly and resilient means engageable with a portion of the label for holding the label in feeding engagement with the label feeding roll.

3. A machine for applying labels comprising means for feeding packages to be labeled, a hopper for labels, means including a feeding roll for feeding the labels one at a time from the hopper into the path of movement of the packages, guiding means for guiding the label downwardly, and resilient means engageable with a portion of the label for holding the label in feeding engagement with the label feeding roll.

4. A machine for applying labels comprising means for feeding packages to be labeled, a hopper for labels, means including a feeding roll for feeding the labels one at a time from the hopper into the path of movement of the packages, guiding means for guiding the label downwardly, resilient means engageable with a portion of the label for holding the label in feeding engagement with the label feeding roll, and means for intermittently lifting the labels in the hopper as the rear edge portion of the bottom label engages the feed roll to prevent the feeding of the next label until the last label has been fed into the path of movement of the package.

5. In a machine for applying labels to packages comprising means for feeding packages to be labeled, said means comprising endless feeding means including chains, feed bars carried thereby and engageable with the packages, and means mounted on and carried by said chains for maintaining said bars substantially vertical as they move out of feeding engagement with the packages.

6. In combination, a hopper for labels, a feed roll below the hopper engageable with the leading edge of the lowermost label, the weight of the stack of labels in the hopper pressing the bottom label against the feed roll, a guide engageable with the forward edge to guide the label downwardly, resilient means extending through the guide for pressing the label into feeding engagement with the feed roll, and means for lifting the labels in the hopper as the feed roll completes its feeding operation on each label.

7. In combination, a hopper for labels, a feed roll below the hopper engageable with the leading edge of the lowermost label, a guide engageable with the forward edge to guide the label downwardly, and resilient means extending through the guide for pressing the label into feeding engagement with the feed roll.

8. A machine for applying labels comprising means for feeding packages to be labeled, means for feeding labels across the path of movement of the packages, a support for receiving the packages and labels as they are fed forwardly by the package feeding means, the packages and labels thereon being fed along said support by the packages in the rear thereof, the label feed being so timed with the package feed that, as the labels are delivered into the path of movement of the packages by the label feed, the labels will be clamped or held between the front of the package being fed and the package on the support immediately in front of said package.

WILHELM B. BRONANDER.